UNITED STATES PATENT OFFICE.

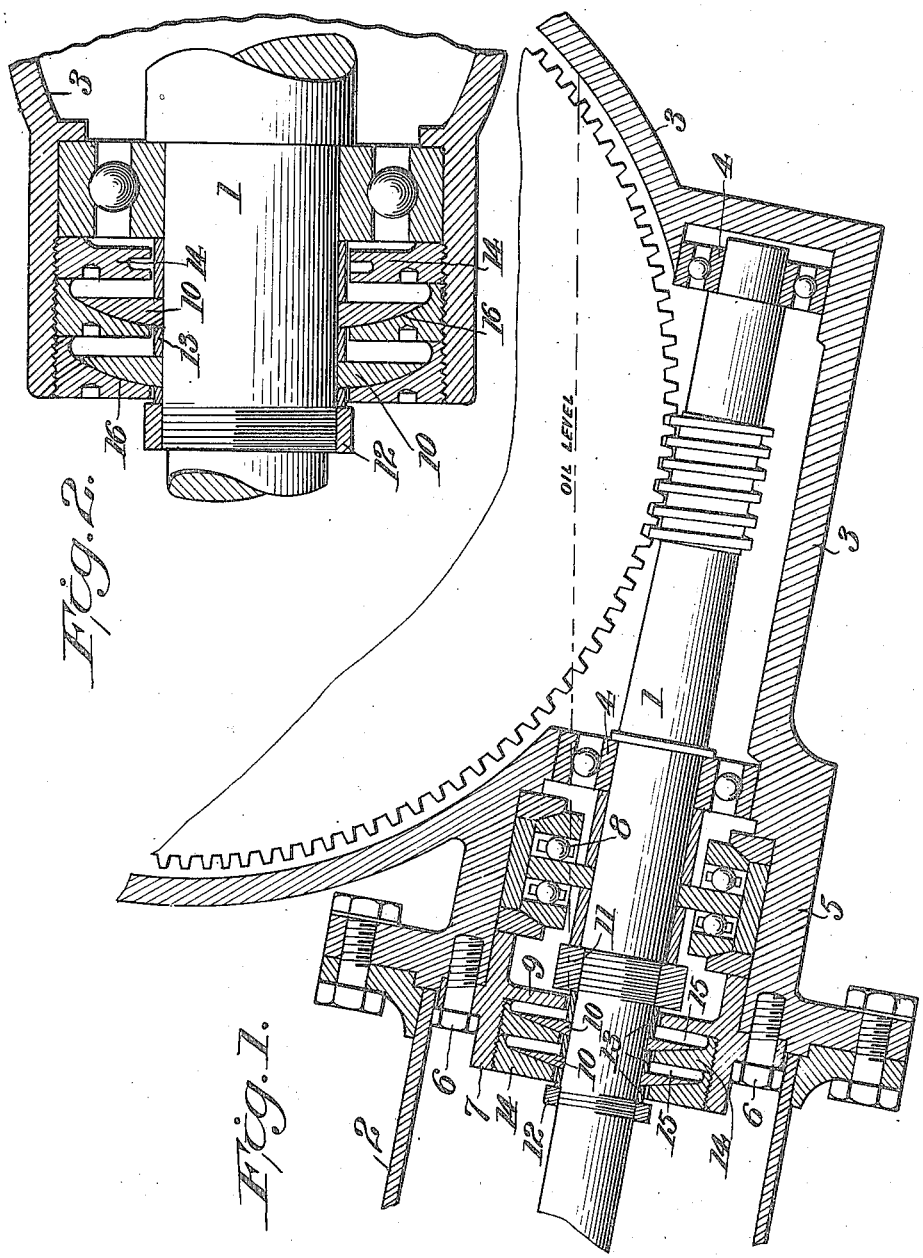

OLIVER P. FRITCHLE, OF DENVER, COLORADO.

OIL-RETAINING DEVICE FOR BEARINGS.

1,166,201.

Specification of Letters Patent.  Patented Dec. 28, 1915.

Application filed March 10, 1914. Serial No. 823,823.

*To all whom it may concern:*

Be it known that I, OLIVER P. FRITCHLE, a citizen of the United States, residing at Denver, in the county of Denver and State of Colorado, have invented certain new and useful Improvements in Oil-Retaining Devices for Bearings, of which the following is a specification.

This invention relates to devices for retaining lubricating-oil in bearings, and particularly to such devices as are required, for instance, in motor-vehicles to prevent the exudation of the oil and entrance of dust and dirt.

Heretofore, in motor-vehicles and especially in those of the "worm-drive" type, where, as is well known, an abundance of oil is absolutely necessary for successful operation, attempts have been made to provide retainers of felt about the revolving shaft beyond the bearings for preventing issue of the oil and the admission of dust. These retainers are not satisfactory for the reason that they wear out rapidly, and furthermore cause considerable friction, if sufficiently tight, on shafts running at high speeds.

The object of this invention is to provide a retainer which is simple in construction, yet free of the aforementioned objections, and which may be used either on plain or ball-bearing shafts.

Briefly, the improved device comprises one or more retaining or lock-rings secured to the casing of the shaft just beyond the bearing, each ring being provided interiorly with a dished or cut-away surface, and one or more tapered disks rigidly secured upon the rotating shaft and having their outer surfaces conforming in shape to the inner dished faces of the adjacent retaining or lock-rings, the inner faces of these rotating disks being flat and in a plane at substantially right-angles to the axis of the shaft. The arrangement of the parts is such that, when assembled, the outer faces of the rotating disks are very close to or even abutting the inner dished faces of the adjacent lock-rings, so that any creeping of the oil around the disks in excess of that required to avoid undue friction between the parts is prevented, this outward movement of the oil being also checked by the centrifugal force with which it meets in attempting to work its way into the confined space between a rotating disk and its adjacent retaining-ring. The oil is thus kept back in its proper place around the bearings, and all dust and dirt is effectively excluded. Spacing-rings are provided to maintain the retaining-rings and the disks properly spaced, and a lock-nut secures the parts in place on the shaft.

One embodiment of the invention is shown in the accompanying drawing, wherein:

Figure 1 is a longitudinal view, partly in section and partly in elevation, of the driving-shaft and bearing of a "worm-drive" automobile, provided with the new oil-retaining device; and Fig. 2 is an enlarged similar view of a bearing having disks of a somewhat different shape.

In the drawing, the numeral 1 indicates the driving-shaft of a motor-vehicle, extending from the torsion-tube 2 downward and into the lower portion of a closed gear-casing 3 in which it turns in suitable bearings 4, 4. In a neck 5 of the gear-casing is secured, as by bolts 6, 6, a flanged sleeve 7 serving among other things to maintain the parts of the thrust-bearing 8 in place. The interior of the outer end of this sleeve is threaded, and an integral partition 9 preferably extends inward from its central portion. Secured upon the shaft 1 and revoluble therewith are tapered disks 10, 10, spaced from each other and from inner and outer lock-nuts 11 and 12 by suitable spacing-rings 13. One of these revolving disks may be sufficient for the particular purpose, but, as shown, two or more are preferred. Turned into the threaded outer end of the sleeve 7 are threaded oil-retaining and lock-rings 14, these rings, when the parts are initially assembled, abutting or lying very close to the revoluble disks 10. The inner faces of these rings are dished or cut out to conform along the central portion to the shape of the outer sloping faces of the disks 10 which disks are so thin as compared with the depth of the pockets in the rings that relatively large oil-spaces 15 are left between the inner vertical faces of the disks 10 and the outer vertical face of the next inner ring 14, or the outer face of the partition 9, as the case may be. These annular chambers 15 thus form oil-channels which serve to collect any oil from the bearing or the gear-case finding its way under the partition 9 or around the next inner disk. The lock-nut 12 serves to secure the parts in proper position.

The operation of the device will be readily understood from the foregoing description.

Any oil from the gear-casing, which, as indicated in the drawing, must be in a quantity sufficient to flood the worm and the shaft-bearings, finding its way past the partition 9 or the first of the locking-rings 14 will lodge in the next outer oil-space 15, and due to the close engagement between the outer faces of the disks 10 and the inner cut out faces of the retaining-rings 14, practically no oil is permitted to pass around the disks in excess of that actually required to prevent too great friction between the abutting surfaces. A sufficient quantity for this purpose will work around the disks on account of their very slight flexibility due to their thinness. Any amount above this will be excluded by virtue of the closeness of the disks and rings, or will be thrust back because of the increased centrifugal force exerted upon it in the confined space between the revolving disks and the adjacent retaining-rings.

A simple and remarkably effective device is thus produced; and, as will be obvious, the invention is equally applicable to plain-bearings, the ball-bearing shown in the drawing merely for the purpose of illustration having nothing to do with the operation of the oil-retaining means, *per se.*

In Fig. 2 a somewhat simpler bearing for a driving-shaft is shown, and the disks illustrated in this instance are quoit-shaped, their outer faces 16 being curved instead of flat, as in Fig. 1. Of course, in such case the inner cut out faces of the retaining-rings are also curved to conform thereto.

It may be thought advisable in some instances to provide oil-retaining devices on both sides of a bearing. Such a duplication of parts is of course within the scope of the present invention, although not shown in the drawing.

I am aware that oil-retaining devices known as "slingers" have heretofore been patented, and that broadly it is not new to keep oil in bearings of other types by means of centrifugal force generated by a disk secured to a revolving shaft, but the devices heretofore known are not applicable to worm-drives where the gearing and bearings are completely immersed in oil, and the working parts are necessarily entirely inclosed.

I claim:—

1. An oil-retainer for worm-gear casings of motor-vehicles, comprising a revoluble shaft, a closed casing about said shaft, rings secured within said casing around said shaft, said rings having dished inner faces, disks secured to said revoluble shaft lying in the dished portions of said rings and having their outer faces conforming in shape to and in close engagement with the inner faces of said rings, and annular oil-chambers adjacent the inner faces of said disks.

2. An oil-retainer for worm-gear casings of motor-vehicles, comprising a revoluble shaft, a closed casing about said shaft, rings secured within said casing around said shaft, said rings having dished inner faces, disks secured to said revoluble shaft lying in the dished portions of said rings and having their outer faces conforming in shape to and lying against the inner faces of said rings, annular oil-chambers adjacent the inner faces of said disks, spacing members on said shaft between said disks, and a lock-nut on said shaft for maintaining said spacing members and said disks in place.

3. An oil-retainer for worm-gear casings of motor-vehicles, comprising a revoluble shaft, a closed casing about said shaft, rings secured within said casing around said shaft, said rings having dished inner faces, tapered disks secured to said revoluble shaft lying wholly within the dished portions of said rings and having their outer faces conforming in shape to and in close engagement with the inner faces of said rings, and annular oil-chambers in said rings adjacent the inner faces of said disks.

4. An oil-retainer for worm-gear casings of motor-vehicles, comprising a revoluble shaft, a closed casing about said shaft, rings secured within said casing around said shaft, each of said rings having a dished inner face terminating peripherally in an outwardly curved portion, disks secured to said revoluble shaft lying in the dished portions of said rings and having their outer faces conforming in shape to and in close engagement with the inner faces of said rings, and annular oil-chambers adjacent the inner faces of said disks and circumferentially inclosed by the curved portions of said rings.

In testimony whereof I affix my signature in presence of two witnesses.

OLIVER P. FRITCHLE.

Witnesses:
A. P. EDWARDS,
A. R. RIDDER.